(12) United States Patent
Shankara (10) Patent No.: US 8,095,549 B2
(45) Date of Patent: Jan. 10, 2012

(54) SEARCHING FOR STRINGS IN MESSAGES

(75) Inventor: Udaya Shankara, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 545 days.

(21) Appl. No.: 11/245,264

(22) Filed: Oct. 5, 2005

(65) Prior Publication Data

US 2007/0106640 A1    May 10, 2007

(51) Int. Cl.
*G06F 7/00* (2006.01)
*G06F 17/30* (2006.01)
*G06F 9/45* (2006.01)
*G06F 3/048* (2006.01)

(52) U.S. Cl. ........ 707/755; 707/796; 707/797; 717/144; 715/853

(58) Field of Classification Search .................. 707/3, 4, 707/5, 6, 755, 796, 797; 715/255–272, 853; 714/24; 375/259; 717/144
See application file for complete search history.

(56) References Cited

U.S. PATENT DOCUMENTS

| | | | |
|---|---|---|---|
| 5,016,249 A * | 5/1991 | Hurst et al. | 714/24 |
| 5,151,950 A * | 9/1992 | Hullender | 382/187 |
| 5,424,709 A * | 6/1995 | Tal | 375/259 |
| 6,047,283 A * | 4/2000 | Braun | 707/3 |
| 6,233,580 B1 * | 5/2001 | Kaplan et al. | 1/1 |
| 6,785,677 B1 * | 8/2004 | Fritchman | 707/6 |
| 2004/0030677 A1 * | 2/2004 | Young-Lai | 707/2 |
| 2004/0210663 A1 * | 10/2004 | Phillips et al. | 709/230 |
| 2005/0060295 A1 * | 3/2005 | Gould et al. | 707/3 |
| 2005/0086267 A1 * | 4/2005 | Avadhanam et al. | 707/104.1 |
| 2006/0112264 A1 * | 5/2006 | Agarwal | 713/150 |
| 2006/0123045 A1 * | 6/2006 | Chang et al. | 707/102 |
| 2007/0016604 A1 * | 1/2007 | Murthy et al. | 707/102 |

OTHER PUBLICATIONS http://www.csse.monash.edu.au/~lloyd/tildeAlgDS/Tree/Suffix/ ;Suffix Trees; 10 pages;printed Dec. 29, 2005.

* cited by examiner

*Primary Examiner* — Mohammad Ali
*Assistant Examiner* — Bao Tran
(74) *Attorney, Agent, or Firm* — Blakely, Sokoloff, Taylor & Zafman LLP (57) ABSTRACT

A network device to determine the presence of one or more of the pre-defined strings in a message based on searching for a suffix and a reverse prefix in response to receiving a key search data indicating possible presence of any of the plurality of pre-defined strings. The network device indicates the presence or absence of one or more of the pre-defined strings in the message based on the suffix and prefix search results.

9 Claims, 8 Drawing Sheets

| | KEY | INDEX TO | SUFFIX | PREFIX | REVERSE PREFIX | STRING |
|---|---|---|---|---|---|---|
| 410 | 410 | 411 | 412 | 413 | 414 | 415 |
| 421 | NET | N | NET | INTER | RETNI | INTERNET - String S1 |
| 422 | RNE | R | RNET | INTE | ETNI | |
| 423 | ERN | E | ERNET | INT | TNI | |
| 424 | TER | T | TERNET | IN | NI | |
| 425 | NTE | N | NTERNET | I | I | |
| 426 | INT | I | INTERNET | -- | -- | |
| 441 | NET | N | NET | INTRA | ARTNI | INTRANET - String S2 |
| 442 | ANE | A | ANET | INTR | RTNI | |
| 443 | RAN | R | RANET | INT | TNI | |
| 444 | TRA | T | TRANET | IN | NI | |
| 445 | NTR | N | NTRANET | I | I | |
| 446 | INT | I | INTRANET | -- | -- | |
| 461 | ORM | O | ORM | INETW | WTENI | INETWORM - String S3 |
| 462 | WOR | W | WORM | INET | TENI | |
| 463 | TWO | T | TWORM | INE | ENI | |
| 464 | ETW | E | ETWORM | IN | NI | |
| 465 | NET | N | NETWORM | I | I | |
| 466 | INE | I | INETWORM | -- | -- | |
| 481 | TIN | T | TIN | DRNE | ENRD | DRNETIN - String S4 |
| 482 | ETI | E | ETIN | DRN | NRD | |
| 483 | NET | N | NETIN | DR | RD | |
| 484 | RNE | R | RNETIN | D | D | |
| 485 | DRN | D | DRNETIN | -- | -- | |

SEARCHING FOR STRINGS IN MESSAGES

BACKGROUND

A computer network generally refers to a group of interconnected network devices that may exchange data and/or share the resources. An example of a network device may be a laptop computer, a desktop computer, a mobile phone, a server, a fax machine, a printer, a router, and/or a switch. The network devices such as switches and routers may be provisioned between one or more end systems to support data transfer. A network device after receiving a packet may search for pre-defined strings in the messages to support, for example, one or more of security, billing, and quality-of-service (QoS) and such other applications.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a network device searching for presence of pre-defined strings in the message. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, or acoustical forms. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
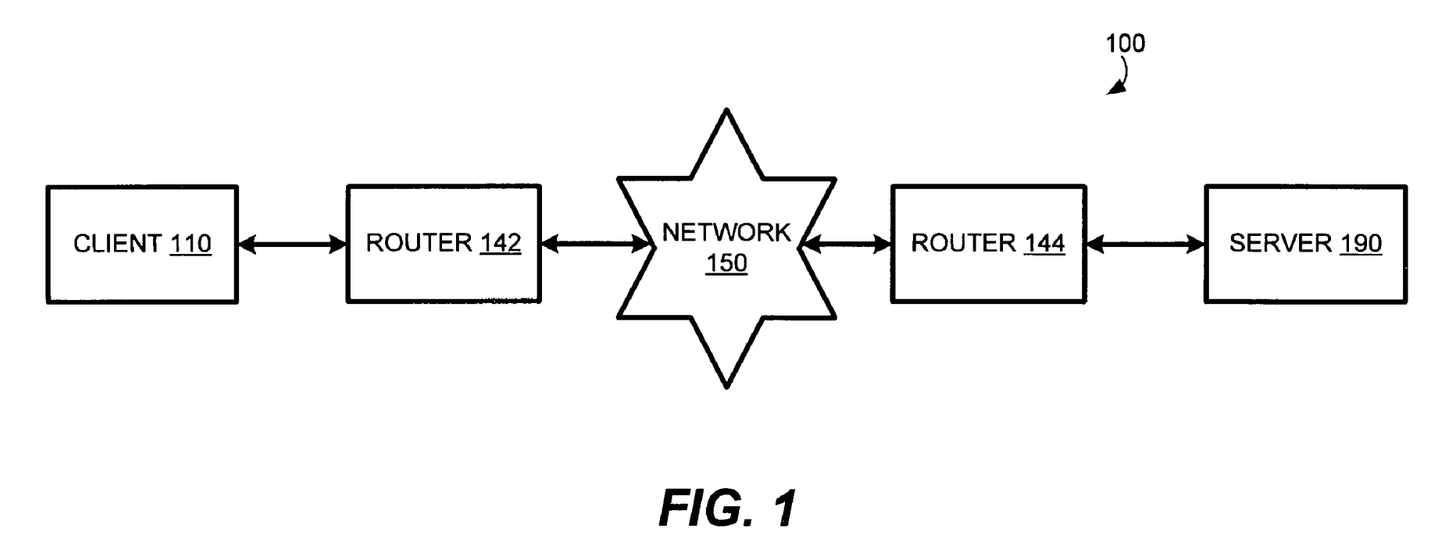
FIG. 1 illustrates an embodiment of a network environment.

An embodiment of a network environment 100 is illustrated in FIG. 1. The network environment 100 may comprise one or more network devices such as a client 110, a router 142 and a router 144, and a server 190 and a network 150. For illustration, the network environment 100 is shown comprising a small number of each type of network devices. However, a typical network environment may comprise a large number of each type of such network devices.

The client 110 may comprise a computer system such as a desktop or a laptop computer that comprises various hardware, software, and firmware components to generate and send data packets to a destination system such as the server 190. The client 110 may be connected to an intermediate network device such as the router 142 via a local area network (LAN) or any other wired or wireless medium to transfer packets or data units. The client 110 may, for example, support protocols such as hyper text transfer protocol (HTTP), file transfer protocols (FTP), TCP/IP, and such other protocols.

The server 190 may comprise a computer system capable of generating a response corresponding to a request received from another network device such as the client 110 and sending the responses to the client 110. The server 190 may be coupled to the network 150 via LAN or any wired or wireless network comprising network devices such as the router 142. The server 190 may comprise a web server, a transaction server, a database server, or any such server systems.

The network 150 may comprise one or more intermediate devices such as switches and routers, which may receive, process, and send the packets to an appropriate intermediate network device or an end network device. The network 150 may enable an end network device such as the client 110 and the server 190 to transmit and receive data. The intermediate network devices of the network 150 may be configured to support various protocols such as TCP/IP.

The routers 142 and 144 may enable transfer of messages between the end network devices such as client 110 and server 190 via the network 150. For example, the router 142 after receiving a packet from the client 110 may determine a next router provisioned in a path to the destination system and forward a packet to the next router. Also, a packet received from the network 150 may be forwarded to the client 110. The router 142 may determine the next router based on the routing table entries, which may comprise address prefixes and port identifiers.

The routers 142 and 144 may support security, billing, quality-of-service, and such other features. In one embodiment, the routers 142 and 144 may perform operations such as searching the messages to determine the presence of one or more pre-defined strings. For example, a security application may search the packet payload to detect the presence of one or more pre-defined strings that may indicate presence of a virus or internet worm in the packet. Other applications may likewise peek into the packet payload, such as for load balancing purposes.

The routers 142, 144, or any other network device may utilize substantial computational resources to perform string search operations. In one embodiment, the router 142 may comprise Intel® IXP 2400® network processor to perform packet processing. The router 142 may search the messages to detect the presence of one or more keys. The key search may be performed in the fast path comprising, for example, a combination of a content addressable memory (CAM) system and one or more micro-processing engines. The keys to be searched in the packet payloads may equal selected portions (or sub-strings) of the pre-defined strings. However, the router 142 may perform byte-to-byte comparisons, in a slow path or control plane that may comprise, for example, XScale® core, to detect if one or more pre-defined strings are completely present in the messages. Such byte-to-byte comparisons in the slow path may be based on the key search results performed in the fast path.

Such an approach may enable network devices to process packets at line rates in the fast path and to detect the presence of strings with increased speed in the slow path. The network devices may search for the pre-defined strings in the slow path with increased speed as the search complexities may be reduced from O(P) to O(L) due to the detection of key in the fast path and byte-to-byte comparisons in the slow path. The O(P) represents the complexity of searching a message of length P and O(L) represents the complexity of searching a pre-defined string of set S having an average length L. As L is less than P, the complexity of search is reduced.

Figure 2:
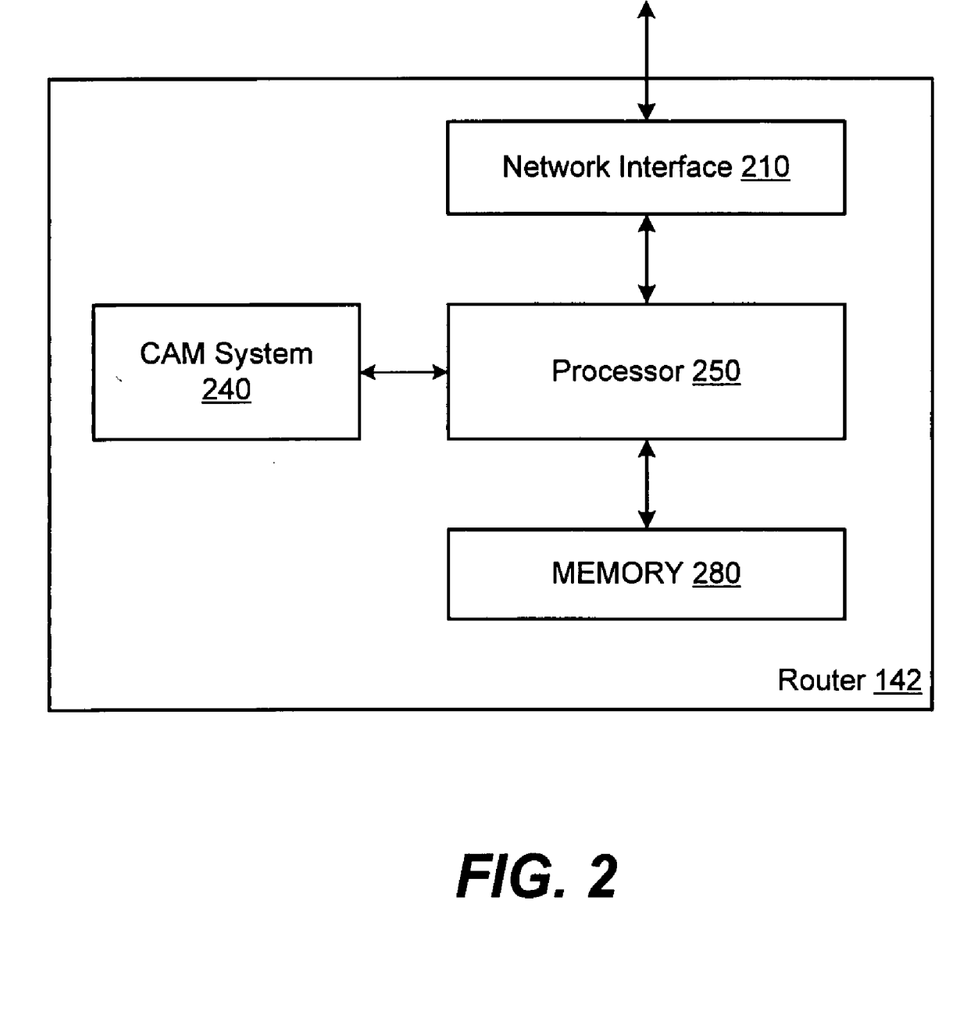
FIG. 2 illustrates an embodiment of a network device of the network environment of FIG. 1.

An embodiment of the router 142 is illustrated in FIG. 2. The router 142 may comprise a network interface 210, a content addressable memory (CAM) system 240, a processor 250, and a memory 280. In one embodiment, the message may equal a packet payload. However, the message may represent packet control data and such other data structures. The description is continued with packet payload as an example of the message. The router 142 may receive one or more packets from the client 110 and may determine, for example, the presence of one or more pre-defined strings in the packet payload.

The network interface 210 may provide an interface for the router 142 to send and receive packets to and from one or more network devices coupled to the router 142. For example, the network interface 210 may receive one or more packets from the client 110 and send the packets to the processor 250 for further processing, receive the processed packets from the processor 250 and forward the packets to the network 150. The network interface 210 may provide physical, electrical, and protocol interfaces to transfer the packets between the client 110 and the network 150.

The memory 280 may store one or more packets and packet related data that may be used by the processor 250. In one embodiment, the memory 280 may store packets, a set of pre-defined strings, a set of indices indicating the position of the keys present in the packet payload, and data structures such as linked lists to traverse the suffix tree and the prefix tree. In one embodiment, the memory 280 may comprise a dynamic random access memory (DRAM) and a static random access memory (SRAM).

The content addressable memory (CAM) system 240 may perform the fast path processing to detect the presence of one or more keys in the packet payload using techniques such as hashing. In one embodiment, the CAM system 240 may determine the hash value of the sub-strings of each pre-defined string and may store the resulting pre-defined string hash values in the CAM system 240. The CAM system 240 may receive one or more packets, generate one or more substrings from each packet, and generate payload hash values by performing hashing on substrings of the packet payload. The CAM system 240 may then compare the payload hash values with the pre-defined string hash values stored in the CAM system 240.

In one embodiment, the length of the substrings may be less than the length of the pre-defined strings and the length of the hash values of the substrings may be less than the length of the substrings. As a result, the CAM system 240 may quickly detect the presence of one or more keys based on the comparison performed between the hash values. The CAM system 240 may send a key search data to the processor 250 if one or more keys are detected in the packet payload. The key search data may comprise one or more substrings that may represent the detected keys and the corresponding indices that may indicate the position of the keys within the packet payload.

An embodiment describing the detection of one or more keys in the fast path and sending key search data to the slow path is described in a pending patent application Ser. No. 11/018,942 titled "Efficient CAM-based techniques to perform string searches in packet payloads" naming Udaya Shankara et al as inventors, assigned to Intel Corporation, and filed on Dec. 21, 2004.

The CAM system 240 may quickly detect the presence of one or more keys. However, the CAM system 240 may consume substantial computational resources for detecting the presence of a complete string based on byte-by-byte comparison. The byte-by-byte comparisons may consume significant amount of time relative to line-rate speeds and thus are too slow to be performed at line-rate speed.

The processor 250 may detect the presence of one or more pre-defined strings in the packet payload based on byte-by-byte comparisons and the key search data received from the CAM system 240. In one embodiment, the processor 250 may receive the key search data that may indicate the presence of one or more keys in the packet payload. In one embodiment, the key search data may comprise flags indicating either the presence or absence of one or more keys and the corresponding index positions, which may indicate the position of each key in the packet payload. The processor 250 may search the packet payloads based on the suffix tree to detect the presence of valid suffixes and the prefix tree to detect the presence of corresponding valid prefixes.

In one embodiment, the processor 250 may receive one or more packets from the network interface 210, send the packets to CAM system 240, receive data such as the output port identifier, further process the packets, and send the packets on an appropriate port of the network interface 210. The processor 250 may detect the presence of one or more pre-defined strings in the packet payload based on byte-by-byte comparisons after receiving the key search data from the CAM system 240.

Figure 3:
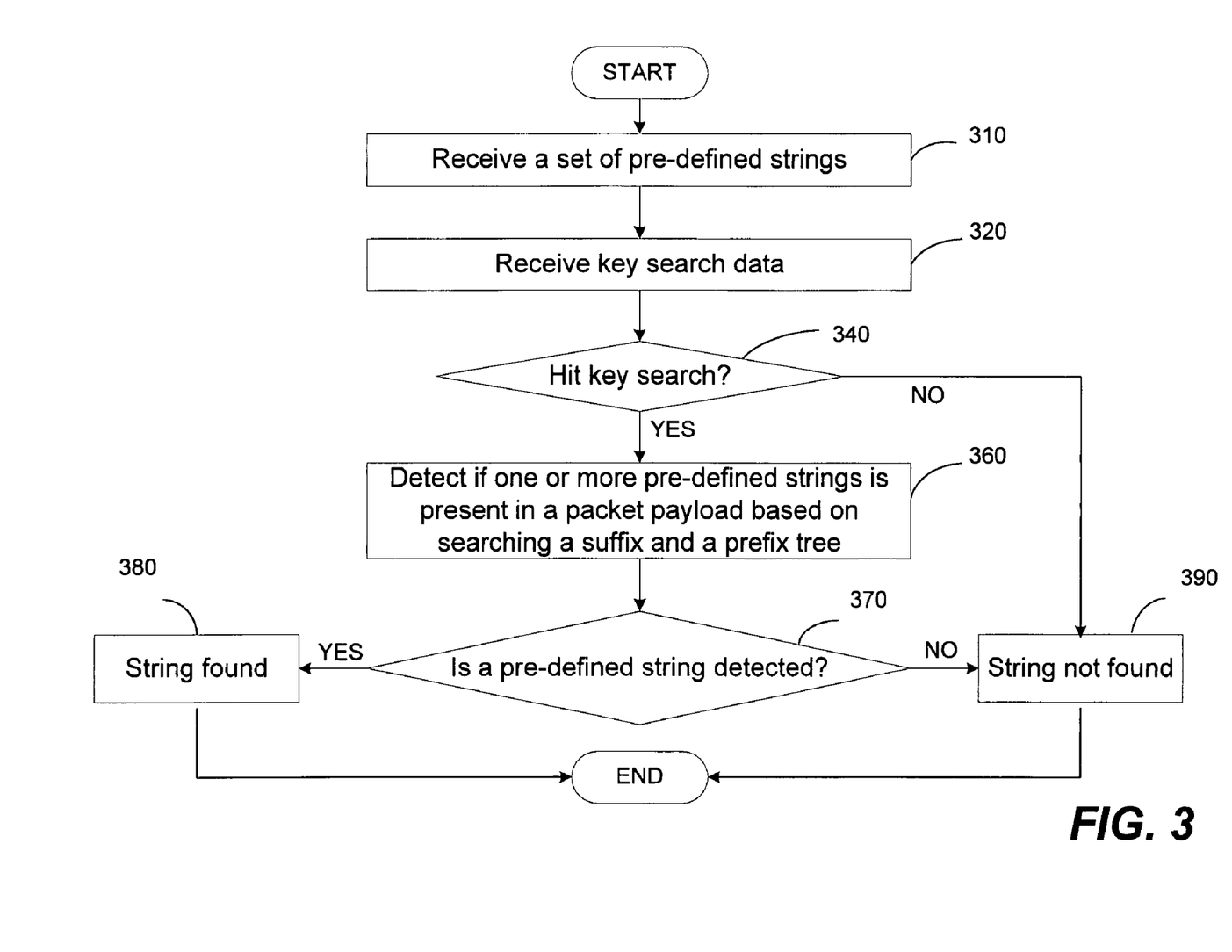
FIG. 3 illustrates an embodiment of the operation of the network device of FIG. 2.

An embodiment of the operation of the processor 250 is illustrated in FIG. 3. In block 310 the processor 250 may receive the set of pre-defined strings. In one embodiment, the set of pre-defined strings may be represented by S. For example, the set S may comprise strings S1, S2, S3, and S4 equaling INTERNET, INTRANET, INETWORM, and DRNETIN respectively.

In block 320, the processor 250 may receive a key search data. In one embodiment, the key search data may indicate the presence or absence of one or more keys in the packet payload the corresponding index positions as well.

In block 340, the processor 250 may determine whether the key search data is a hit key search. The processor 250 may determine the key search data to be a hit key search, for example, by checking the status of a specific bit in the key search data. The processor 250 may receive the key search data from the CAM system 240 after the CAM system 240 detects the presence of a key equaling, for example, ERN in a packet payload. The packet payload, for example, may equal 'internetandintranetsareaffectedbyinetwormsanddrnetin'.

In block 360, the processor 250 may detect the presence of one or more pre-defined strings in the packet payload based on searching the suffix tree and the prefix tree. The processor 250 may search the suffix tree to detect the presence of a valid suffix of one or more pre-defined strings in the packet payload and then search the prefix tree comprising reversed prefixes to detect one or more valid prefixes. The processor 250 may determine the presence of one or more pre-defined strings in the packet payload based on the detected valid suffixes and prefixes.

For example, the processor 250 may search the suffix tree starting from the index position pointing to E and may determine the presence of a valid suffix ERNET in one of the paths of the suffix tree. The processor 250 may then search the prefix tree starting from a position one less than the index position and may determine the presence of a valid reverse prefix TNI in one of the paths of the prefix tree.

In block 370, the processor 250 may check if one or more of the pre-defined strings are determined to be present in the packet payload. For example, the processor 250 may collate the search results and determine that a pre-defined string S1 equaling INTERNET is present in the packet payload.

In block 380, the processor 250 may indicate that the string is found in the packet payload. For example, the processor 250 may indicate the presence of the pre-defined string S1 in the packet payload.

In block 390, the processor 250 may indicate that the string is not found in the packet payload.

Figure 4A:
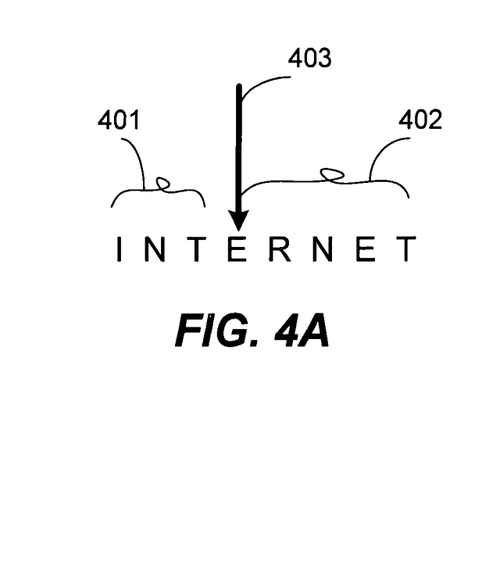
FIG. 4A illustrates a pre-defined string and a corresponding suffix and a prefix based on an index.

A pre-defined string, the corresponding suffix and the reverse prefix determined based on the position of the index is illustrated in FIG. 4A. In one embodiment, the suffix of a key may equal all the elements towards the right ("forward direction") of the index element including the index element. The reverse prefix of the key may equal all the elements towards the left ("reverse direction") of the index element starting at a position one less than the index position. For example, the CAM system 240 may determine a hit while searching for a key ERN in the packet payload. The processor 250 may receive a key search data indicating the presence of the key ERN and an index 403 pointing to the position of E. The corresponding suffix portion equals ERNET indicated by portion 402 and the corresponding prefix portion equals INT indicated by portion 401. The reverse prefix equals TNI.

Figure 4B:
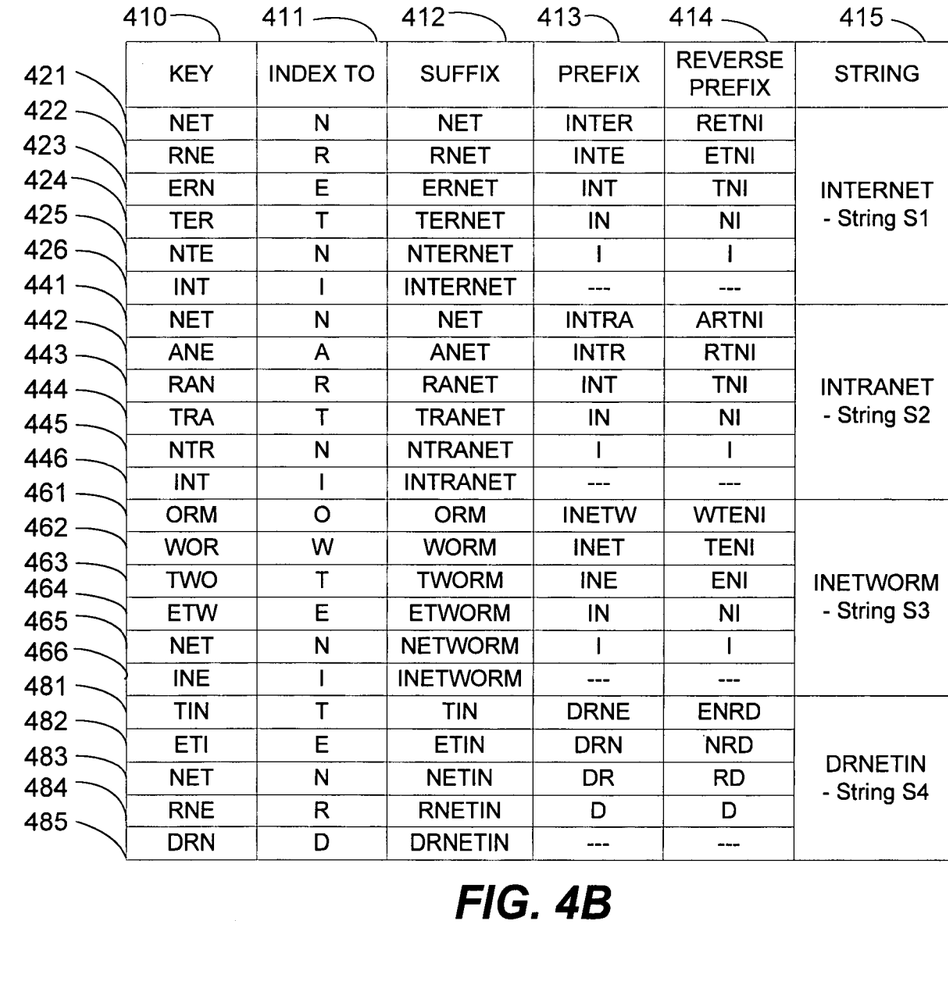
FIG. 4B is a table comprising a key, a corresponding suffix, a prefix, and a reverse prefix of a set of pre-defined strings.

The keys, the corresponding index position, the suffix, the prefix, and the reverse prefix for each pre-defined string S1, S2, S3, and S4 is illustrated in table 400 of FIG. 4B.

Row 421 comprises a key equaling NET, an index element N, a suffix NET, a prefix INTER, and a reverse prefix RETNI, and a corresponding pre-defined string S1 INTERNET, respectively, in the columns 410, 411, 412, 413, 414, and 415. Row 422 comprises a key equaling RNE, an index element R, a suffix RNET, a prefix INTE, and a reverse prefix ETNI, and INTERNET, respectively, in the columns 410, 411, 412, 413, 414, and 415. Similarly, rows 423-426 comprise the corresponding elements of the key ERN, TER, NTE, and INT respectively for the string S1.

Similarly, rows 441-446, 461-466, and 481-485 comprise possible keys, corresponding index elements, suffixes, prefixes, and reverse prefixes for pre-defined strings S2, S3, and S4 respectively.

Figure 5:
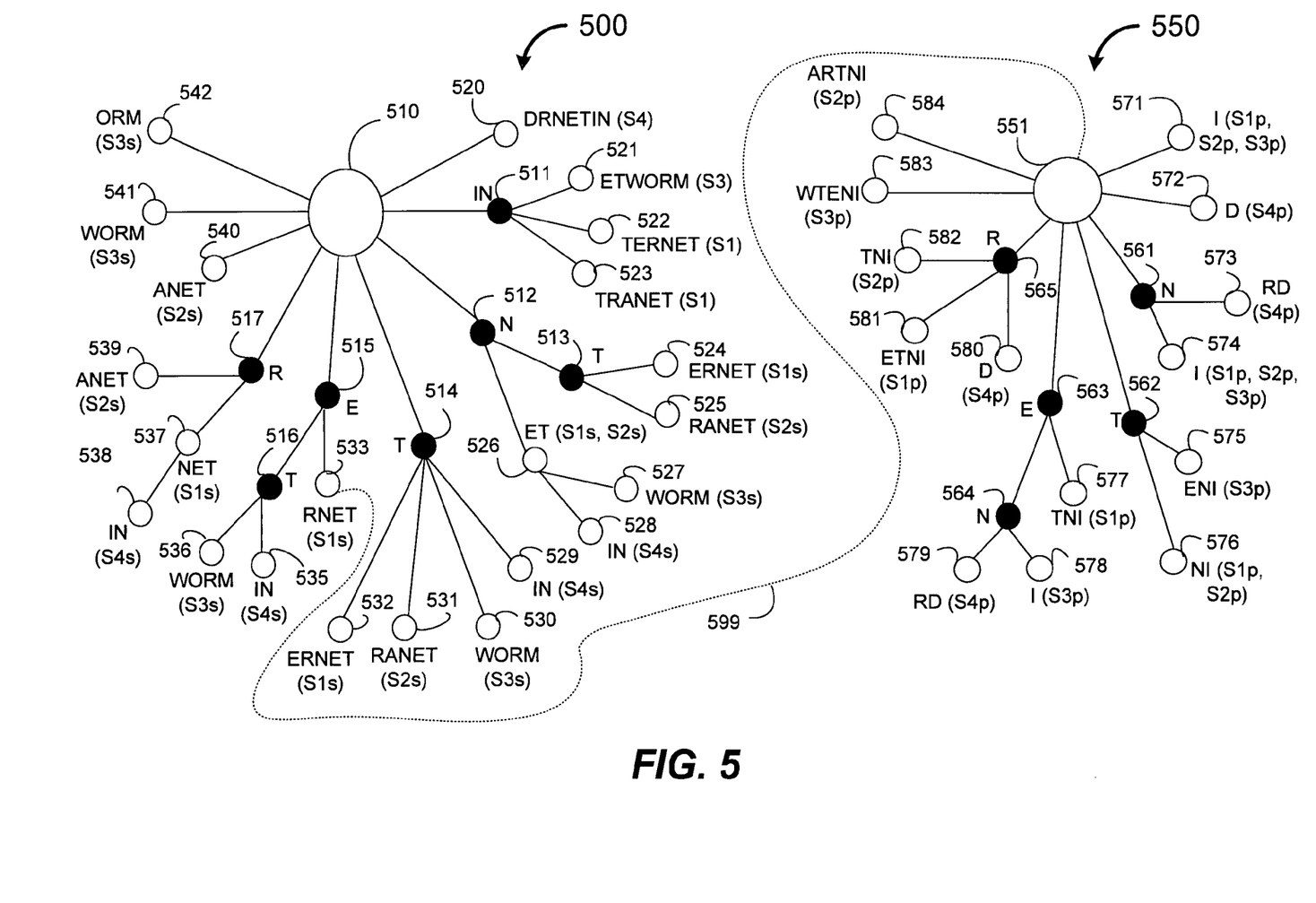
FIG. 5 illustrates a suffix tree and a prefix tree for the set of pre-defined strings of FIG. 4B that may be used to determine the presence of one or more pre-defined strings in the message.

An embodiment of a suffix tree 500 and a prefix tree 550 is illustrated in FIG. 5. The suffix tree 500 may comprise a root 510, invalid nodes such as 511-517, and valid nodes 520-542. A node that comprises elements that does not represent a valid suffix for a string in set S may be referred to as an 'invalid node'. For example, nodes 511-517 respectively equaling IN, N, NT, T, E, ET, and R are invalid suffixes as the elements do not represent a valid suffix for the strings S1, S2, S3, and S4 and the nodes 511-517 are thus referred to as invalid nodes. A node that comprises elements that represent a valid suffix for a string in set S may be referred to as a 'valid node'. In one embodiment, the nodes 520-542 represent valid nodes. For example, the nodes 533, 535, and 536 may represent ERNET, ETIN, and ETWORM, respectively, which represent valid suffixes of strings S1, S4, and S3.

Each valid node may comprise a tag that includes the string(s) identifier and the suffix tree identifier. For example, the valid node 533 may represent the suffix elements of all the nodes in the path from the root 510 in that order and may equal ERNET. The valid node 533 may comprise a tag equaling (S1s), wherein 'S1' represents the string identifier of a string comprising ERNET and 's' represents the tree identifier indicating that the node 533 is a node of the suffix tree 500. A single valid node in the suffix tree 500 may be a suffix of one or more keys and such nodes may comprise one or more tags comprising one or more string identifiers. For example, node 526 representing NET is a valid suffix of pre-defined strings S1 and S2. Thus, the valid node 526 may comprise a tag equaling (S1s, S2s). Also, each valid node in the suffix tree 500 may be linked to the root 551 of the prefix tree 550 using pointers referred to as 'node-to-root pointer'. For conciseness, only one such node-to-root pointer 599 is shown between the valid node 533 of the suffix tree 500 and a root 551 of the reverse prefix tree 550.

The prefix tree 550 of pre-defined strings S1, S2, S3, and S4 is illustrated in FIG. 5. The prefix tree 550 may comprise a root 551, invalid nodes 561-565, and valid nodes 571-584. For example, the elements of invalid nodes 561-565 equaling N, T, E, EN, and R, respectively, may not be valid reverse prefixes of any string S1, S2, S3, and S4. The elements of valid nodes 571-584 equaling I, D, NRD, NI, TENI, TNI, ETNI, ENI, ENRD, RD, RETNI, RTNI, WTENI, and ARTNI respectively may represent the valid reverse prefixes of one or more strings S1, S2, S3, and S4. Each valid node may comprise a tag that indicates one or more string identifiers of the pre-defined strings comprising that reverse prefix and the prefix tree identifier. For example, the reverse prefix corresponding to valid node 576 may equal TNI (T of node 562 and NI of node 576) of the pre-defined string INTERNET. The valid node 576 may comprise tags S1p and S2p, wherein 'S1' and 'S2' represents the string identifier and 'p' represents that the valid node 576 is a portion of the reverse prefix tree 550.

Figure 6:
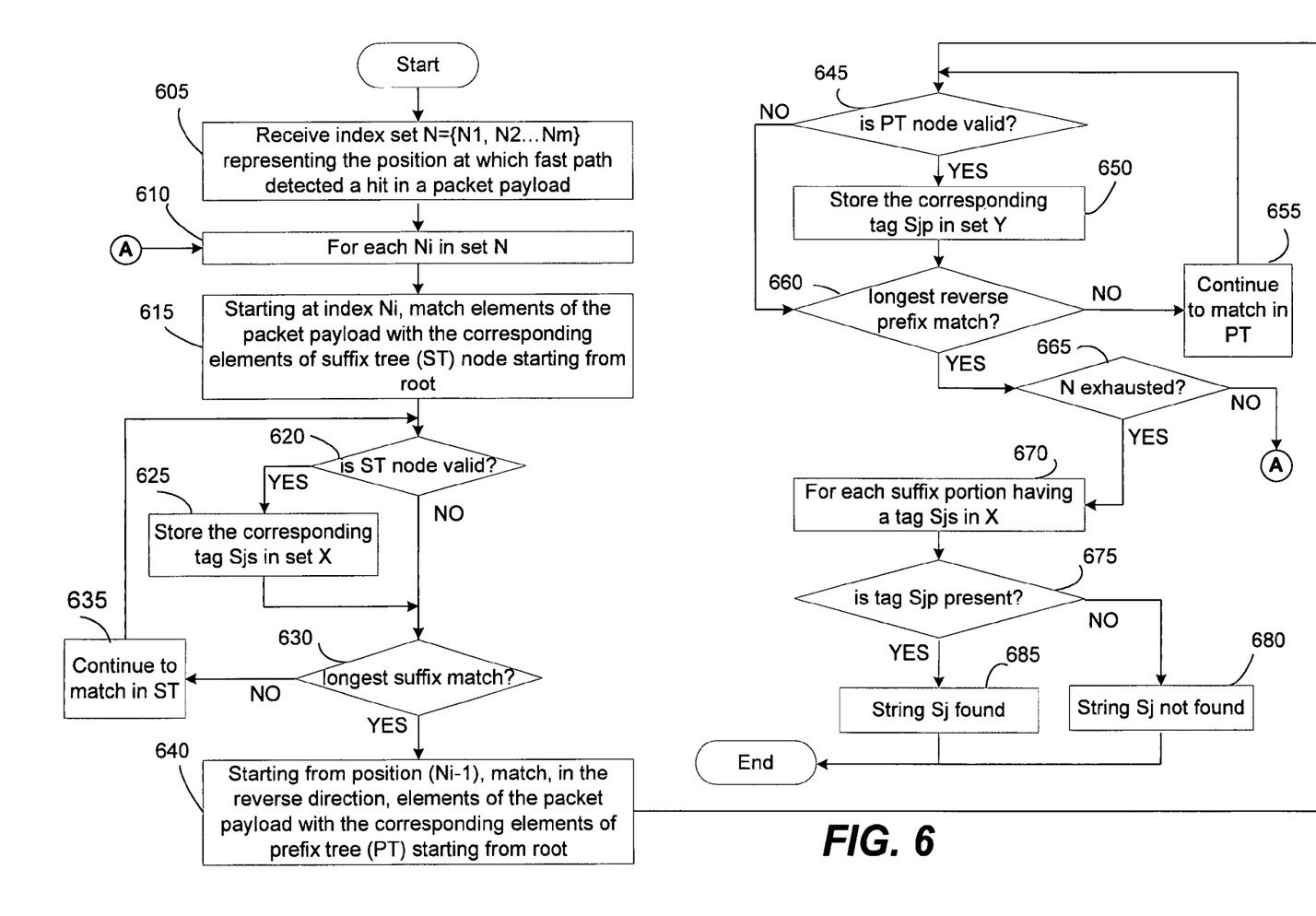
FIG. 6 illustrates an embodiment of an operation of the network device detecting the presence of one or more pre-defined strings in the message based on searching the suffix tree and the prefix tree of FIG. 5.

An embodiment of the operation of the processor 250 that may search the payload to detect the presence of one or more pre-defined strings is illustrated in FIG. 6. In block 605, the processor 250 may receive an index set N comprising {N1, N2 ... Nm} indices, each representing the position at which the CAM system 240 detected hits in the fast path. For example, the CAM system 240 may detect the presence of keywords ERN, RNE, NET, ORM, TIN and such other keys. The length of the keys equal 3 bytes and is less than the average length of all the pre-defined strings in set S.

In block 610, the processor 250 selects an index Ni corresponding to a key from set N. For each index Ni, the processor 250 performs the operations indicated in blocks 615 through 665. For example, the processor 250 may select an index N1 corresponding to the key ERN.

In block 615, the processor 250, starting from the index Ni, may match the elements of the packet payload with the corresponding elements of the suffix tree 500 starting from the root 510. In one embodiment, the processor 250 may perform byte-by-byte comparison by traversing the suffix tree 500. For example, the processor 250 may traverse a path of the suffix tree 500, starting at the root 510, to determine if a suffix of the key ERN is present. To this end, the processor 250 may traverse and reach node 515 representing a byte E.

In block 620, the processor 250 may check if the suffix tree node is a valid node and control passes to block 625 if the suffix tree node is valid and to block 630 otherwise. Continuing with the above example, the node 515 represents an invalid node and control passes to block 630. The invalid nodes do not comprise the tags.

In block 625, the processor 250 may store the corresponding tag Sjs in set X. In one embodiment, the processor 250 may use data structures such as linked list to traverse the suffix tree 500. The processor 250 may store the information of each node traversed in the suffix tree 500. For example, the processor 250 may store the tag S1s corresponding to the node 533.

In block 630, the processor 250 may check if the elements corresponding to the valid node represent the longest suffix match and causes control to pass to block 640 if the condition is true and to block 635 otherwise. The processor 250 may repeat the process until node 533 is reached and the elements detected in the traversed path equals ERNET. The node 533 represents a valid node and is a longest matching suffix as well and the processor 250 may cause control to pass to block 640.

In block 635, the processor 250 may continue to traverse the suffix tree 500 to determine a longest matching suffix.

In block 640, the processor 250 may, starting from position (Ni−1), match, in the reverse direction, the elements of the packet payload with the corresponding elements of the nodes in the prefix tree 550. The processor 250 may reach the root 551 of the prefix tree 550 using a node-to-root pointer. It may be noted that all the valid nodes of the suffix tree may be linked to the root 551 of the suffix tree 500 using a corresponding node-to-root pointer. As a result, the processor 250 may maintain the information such as suffix tags of all the valid suffix nodes traversed in a specific path before reaching the root 551 of the prefix tree.

The processor 250 may start traversing the prefix tree 550 after determining the presence of a longest valid matching suffix. The processor 250 may traverse one or more paths in the prefix tree 550 to determine if a reverse prefix TNI of INTERNET is present in the prefix tree 550.

In block 645, the processor 250 may check if the prefix tree node is a valid node and control passes to block 650 if the prefix tree node is valid and to block 660 otherwise. In the above example, the processor 250 may reach the node 563, which represents an invalid node and control passes to block 660.

In block 650, the processor 250 may store the corresponding tag Sjp in set Y. In one embodiment, the processor 250 may use data structures such as linked list to store the information of each node. For example, a linked list may be used to traverse the prefix tree 550. In one embodiment, the processor 250 may store the corresponding tag S1p of the valid node 577. The S1 portion in the tag represents the string identifier of the pre-defined string S1, which comprises the corresponding reverse prefix ETNI and p indicates that the prefix tree 550 comprises the node 577.

In block 660, the processor 250 may check if the elements corresponding to the valid reverse prefix node represent the longest reverse prefix match and cause control to pass to block 665 if the condition is true and to block 655 otherwise. In the above example, the node 563 does not represent a longest matching prefix and control passes to block 655. The logic of blocks 645, 660, and 655 may be repeated until a longest reverse prefix match is found. In the above example, the logic may be repeated until the node 577, which represents a valid node representing a longest reverse prefix match ETNI is found and the processor 250 may cause control to pass to block 665.

In block 655, the processor 250 may continue to traverse the prefix tree 550 for detecting a match.

In block 665, the processor 250 may determine whether the set S is exhausted and causes control to pass to block 670 if the set S is exhausted and to block 610 otherwise. The processor 250 may continue the operations indicated in the above blocks for an index corresponding to another key.

In block 670, the processor 250 may execute the blocks 675, 680 or 685 for each tag Sjs of suffix tree 500 stored in set X.

In block 675, the processor 250 may determine if a tag Sjp is present. The processor 250 may cause control to pass to block 685 if such a tag is present and to block 680 otherwise.

In block 680, the processor 250 may determine that the string Sj is not found in the packet payload.

In block 685, the processor 250 may determine that the string Sj is present in the packet payload. For example, the processor 250 may determine that a pre-defined string S1 equaling INTERNET is present in the packet payload. The collating of reverse prefix string TNI and suffix string ERNET equals the pre-defined string S1 (=INTERNET). Similarly, the processor 250 may detect the presence of strings S2 equaling INTRANET, S3 equaling INETWORM, and string S4 equaling DRNETIN assuming that the packet payload comprises bytes representing INTERNET, INTRANET, INETWORM and DRNETIN.

Thus, the processor 250 may search for presence of one or more pre-defined strings in the packet payload based on byte-by-byte comparison.

Figure 7:
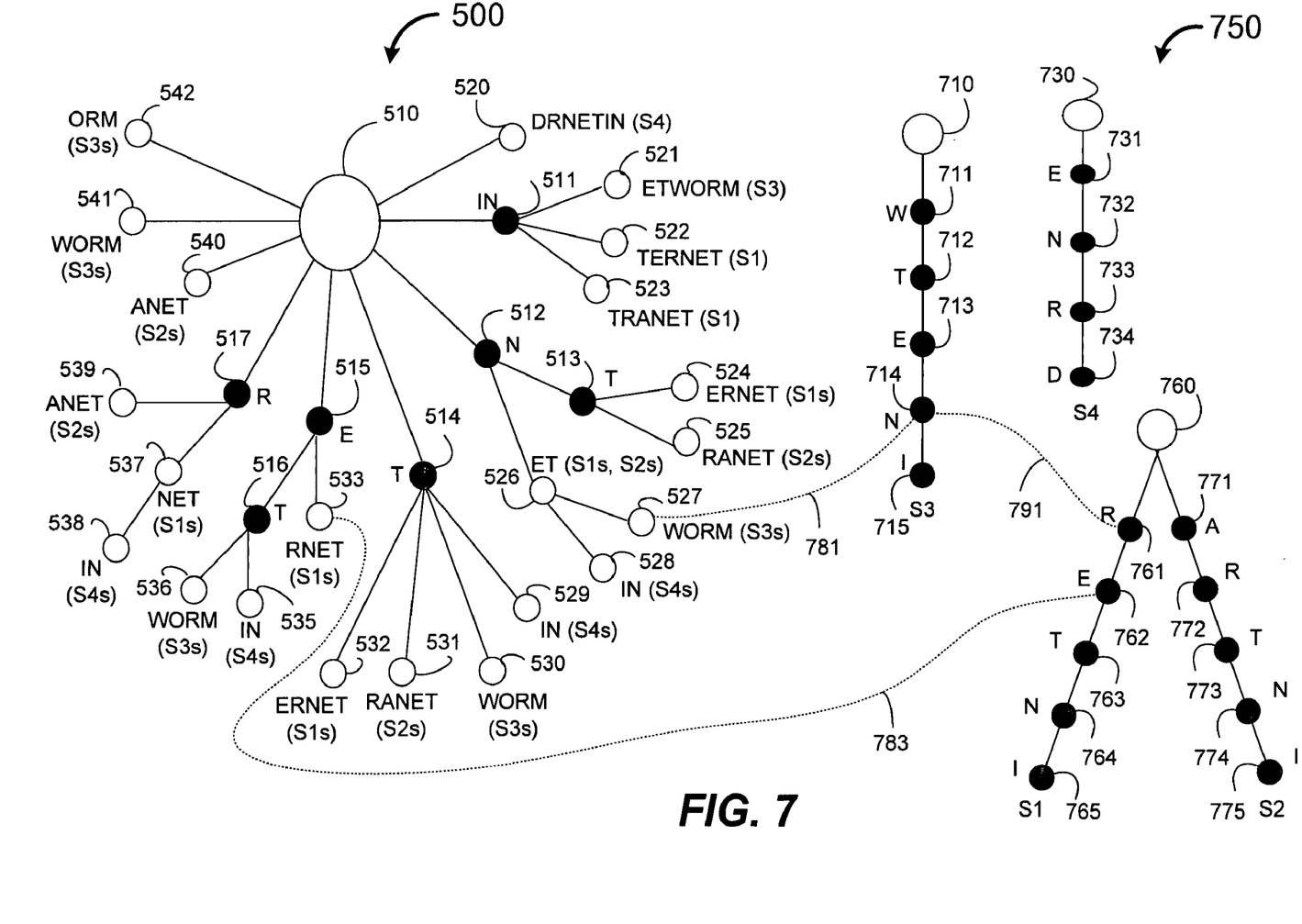
FIG. 7 illustrates the suffix tree and a modified prefix tree that may be used to determine the presence of one or more pre-defined strings in the message.

An embodiment of a suffix tree and a modified prefix tree is illustrated in FIG. 7. The suffix tree of FIG. 7 is similar to the suffix tree 500 of FIG. 5 and is not described again for conciseness.

The modified prefix tree 750 may comprise longest matching reverse prefixes such as 710, 730, and 760. For example, the longest matching reverse prefix 710 may comprise elements W, T, E, N, and I in nodes 711-715 respectively, reverse prefix 730 may comprise E, N, R, and D in nodes 731-734 respectively, and the reverse prefix 760 may comprise R, E, T, N, and I in nodes 761-765 and A, R, T, N, and I in nodes 771-775.

The nodes of the suffix tree 500 and the modified prefix tree 750 may be linked by pointers referred to as 'node-to-node pointers'. The nodes of the modified prefix tree 750 may be linked using pointers referred to as 'jump pointers'. A jump pointer may be used to link nodes of the modified prefix tree 750 if a node-to-node pointer couples to a node that represents an element that is present in two or more reverse prefixes.

Figure 8:
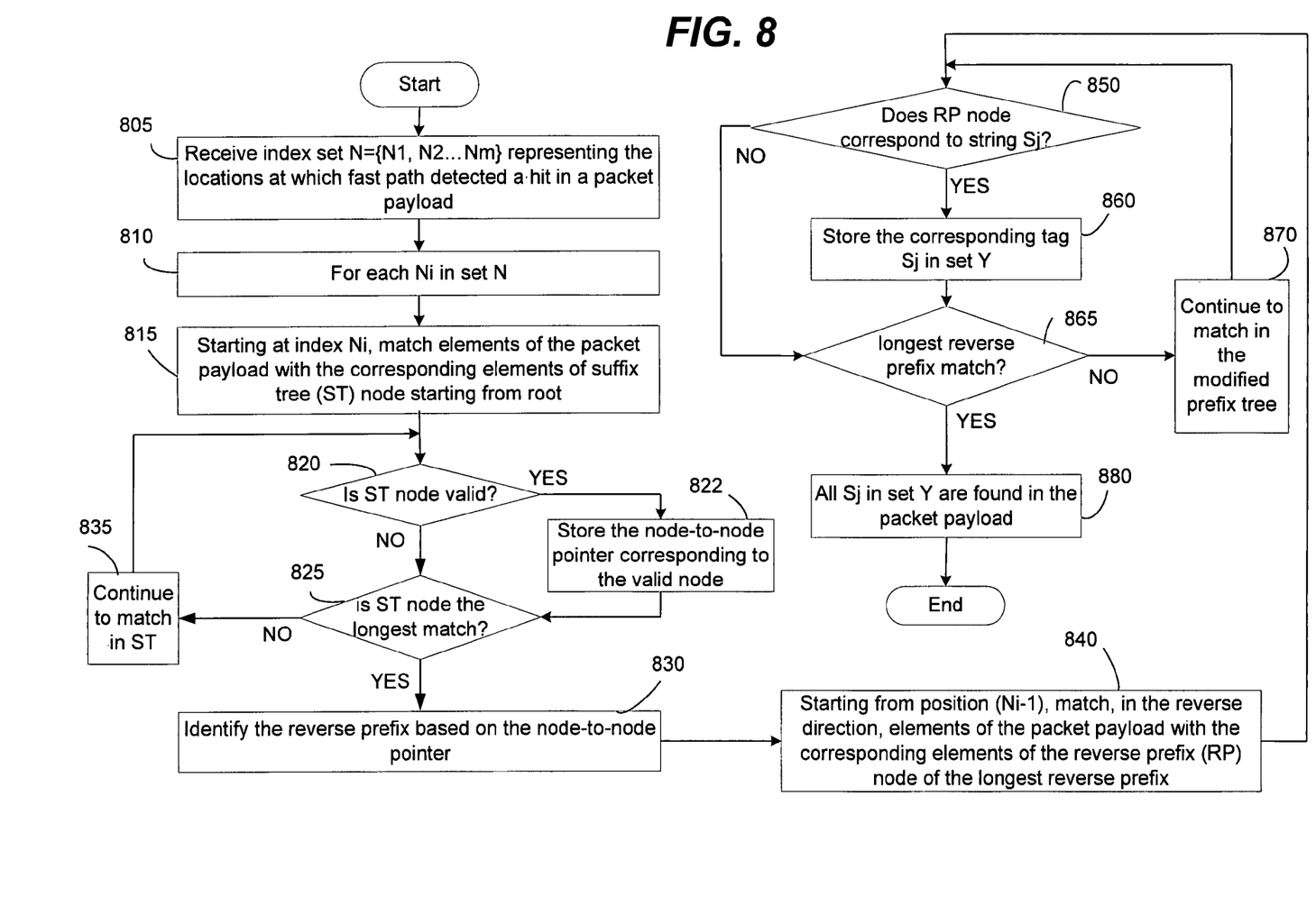
FIG. 8 illustrates an embodiment of an operation of the network device detecting the presence of one or more pre-defined strings in the message based on searching the suffix tree and the modified prefix tree of FIG. 7.

An embodiment of the operation of processor 250 searching the payload to detect the presence of one or more pre-defined strings based on the suffix and modified prefix trees of FIG. 7 is illustrated in FIG. 8. The processor 250 may perform operations in block 805, 810, and 815 similar to operations performed in blocks 605, 610, and 615 of FIG. 6 and the corresponding description is not repeated for conciseness.

In block 820, the processor 250 may check if the suffix tree (ST) node is valid. The processor 250 causes control to pass to block 822 if the condition is true and to block 825 otherwise.

In block 822, the processor 250 may store the node-to-node pointer corresponding to the valid suffix tree node.

In block 825, the processor 250 may check if the suffix node represents a longest matching suffix and control passes to block 830 if the suffix node represents a longest matching suffix and to block 835 otherwise.

In block 830, the processor 250 may identify the longest matching prefix based on the node-to-node pointer stored in block 822.

In block 835, the processor 250 may continue to match the elements of the suffix tree and the blocks 820 to 825 may be repeated until all the nodes in a particular path are traversed.

In block 840, the processor 250 may, starting from position (Ni−1), match, in the reverse direction, elements of the packet payload with the corresponding elements of the longest matching reverse prefix node of the longest reverse prefix of the modified prefix tree 750. The processor 250 may use a node-to-node pointer to reach the specific reverse prefix node of the longest reverse prefix.

It may be noted that the longest valid suffix node is linked to a specific reverse prefix node of the longest reverse prefix match. As a result, the processor 250 may not store the suffix tags of all the valid suffix nodes traversed in a specific path before reaching the reverse prefix node. It may also be noted that no two valid suffix nodes are mapped to same reverse prefix node.

In block 850, the processor 250 may check if the reverse prefix node of the longest reverse prefix is valid. The processor 250 causes control to pass to block 860 if the reverse prefix node is valid and to block 865 otherwise.

In block 860, the processor 250 may store the corresponding tag Sj in set Y. In one embodiment, the processor 250 may use data structures such as linked list to maintain the information of each node traversed in the modified prefix tree 750. In one embodiment, the processor 250 may use a linked list to store the string identifier of the longest matching prefix. The traversed path from the root of the suffix tree to the node of the modified reverse prefix tree 750 is unique and is maintained in the linked list. The processor 250 may not store the tag information in the memory 280 as the tag information is stored in the linked list.

In block 865, the processor 250 checks if the elements corresponding to the valid reverse prefix node represent the longest reverse prefix match, causes control to pass to block 880 if the condition is true and to block 870 otherwise.

In block 870, the processor 250 may continue to traverse the modified prefix tree 750 for detecting a longest reverse prefix match. In block 880, the processor 250 may determine that all Sj in set Y are found in the packet payload.

Thus, the processor 250 determines the presence of one or more pre-defined strings in the packet payload.

In one example, the processor 250 as in block 810 may select an index corresponding to a key ERN and may determine, in blocks 815-835, that the longest matching suffix may equal ERNET corresponding to path comprising nodes 515 and 533. The processor 250 as in block 840 may match the elements, starting from a reverse prefix node 763 (=T) of a longest matching reverse prefix 760. The processor 250 may reach the reverse prefix node 763 of the longest reverse prefix 760 based on the node-to-node pointer 783. The node-to-node pointer 783 links the valid suffix node 533 of the suffix tree 500 to reverse prefix node 762 of the modified reverse prefix tree 750 based on the index element E of the key ERN. However, the processor 250 may start matching from (index−1) position corresponding to T of the reverse prefix node 763 while searching for the reverse prefix.

The processor 250 as in block 850 may determine that the element T corresponding to reverse prefix tree node 763 corresponds to string S1 and the processor 250 may store the corresponding tag S1 in a set Y. The processor 250 may determine that T of node 763 is not a longest valid match, the processor 250, as in block 870, may continue to search until TNI corresponding to node 765 is detected. As T is not a longest reverse prefix match the processor 250 may continue until node 765 representing valid reverse prefix TNI is determined. The linked list may store the tag of the longest reverse prefix 760 representing S1. The processor 250 may thus determine that the pre-defined string INTERNET is present in the packet payload.

In another example, the processor 250 as in block 840 may select an index corresponding to the key NET and the longest valid suffix may equal NETWORM corresponding to a path comprising nodes 512, 526, and 527. The processor 250 may reach the node 714 representing N, based on the node-to-node pointer 781. The processor 250 may determine that the element preceding N is R as in the string INTERNET. The processor 250 may then reach the node 761 based on the jump pointer 791. The processor 250 may then traverse reverse prefix 760 to determine that the node 765 corresponding to RETNI is a valid reverse prefix and may conclude that the string INTERNET is present in the packet payload.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method in a router to search a pre-defined string in a message, comprising:

sending a key and a key index pointing to an index element within the key to a processor in response to determining a presence of the key in the message, wherein determining the presence of the key in the message is performed in a content addressable memory, searching for a suffix by performing a byte-by-byte comparison of the elements of the pre-defined string that occur starting from the index element with corresponding position-wise matching elements of the message in a forward direction starting from the index element, searching for a reverse prefix by traversing a reverse prefix tree, the reverse prefix tree comprising a root node, invalid nodes, and valid nodes, wherein the invalid node of the reverse prefix tree comprises elements that do not represent a valid reverse prefix for a pre-defined string, and performing a byte-by-byte comparison of the elements of the pre-defined string that occur prior to the index element with corresponding position-wise matching elements of the message in a reverse direction starting from an element prior to the index element, wherein the reverse prefix is searched for a longest matching valid reverse prefix, and determining that the pre-defined string is found in the message if the search for the suffix and the longest matching valid reverse prefix is successful, wherein searching for the suffix includes searching for a longest matching valid suffix, and storing tags of the longest matching valid suffix in a memory, wherein searching for the suffix is performed by traversing a suffix tree, wherein the suffix tree comprises a root node, invalid nodes, and valid nodes, wherein an invalid node comprises elements that does not represent a valid portion of the suffix for the pre-defined string, wherein a valid node of the suffix tree comprises elements that represent a valid portion of the suffix for the pre-defined string and a first tag, wherein the first tag includes an identifier of the pre-defined string and an identifier of the suffix tree, wherein the first tag of the valid node that matches the search in the suffix tree is stored in a first set of the memory.

2. The method of claim 1, wherein a valid node of the reverse prefix tree comprises elements that represent a valid reverse prefix for the pre-defined string and a second tag, wherein the second tag includes an identifier of the pre-defined string and an identifier of the reverse prefix tree, wherein the second tag of the valid node that matches the search in the reverse prefix tree is stored in a second set of the memory.

3. The method of claim 2, wherein the search for the pre-defined string is positive if the second tag in the second set has a corresponding first tag in the first set.

4. A network device to search a pre-defined string in a message, comprising: a network interface to receive the message, a content addressable memory system coupled to the network interface, wherein the content addressable memory is to send a key and a key index pointing to an index element within the key to a processor in response to determining the presence of the key in the message, and the processor coupled to the content addressable memory, wherein the processor is to, search for a suffix by performing a byte-by-byte comparison of the elements of the pre-defined string that occur starting from the index element with corresponding position-wise matching elements of the message in a forward direction starting from the index element, search for a reverse prefix by traversing a reverse prefix tree, wherein the reverse prefix tree comprises a root node, invalid nodes, and valid nodes, wherein the invalid node of the reverse prefix tree comprises elements that does not represent a valid reverse prefix for a pre-defined string, and performing a byte-by-byte comparison of the elements of the pre-defined string that occur prior to the index element with corresponding position-wise matching elements of the message in a reverse direction starting from an element prior to the index element, wherein the reverse prefix is searched for a longest matching valid reverse prefix, and determine that the pre-defined string is found in the message if the search for the suffix and the longest matching valid reverse prefix is successful, wherein the processor is to search for a longest matching valid suffix and store tags of the longest matching valid suffix in a memory, wherein the processor is to perform a search for a suffix by traversing a suffix tree, wherein the suffix tree comprises a root node, invalid nodes, and valid nodes, wherein an invalid node comprises elements that does not represent a valid portion of the suffix for the pre-defined string, wherein a valid node of the suffix tree comprises elements that represent a valid portion of the suffix for the pre-defined string and a first tag, wherein the first tag includes an identifier of the pre-defined string and an identifier of the suffix tree, wherein the first tag of the valid node that matches the search in the suffix tree is stored in a first set of the memory.

5. The network device of claim 4 the valid node the reverse prefix tree further comprises a second tag, wherein the second tag includes an identifier of the pre-defined string and an identifier of the reverse prefix tree, wherein the second tag of the valid node that matches the search in the reverse prefix tree is stored in a second set of the memory.

6. The apparatus of claim 5, wherein the search for the pre-defined string is positive if the second tag in the second set has a corresponding first tag in the first set.

7. A computer program product, comprising a computer usable medium having a computer readable program code embodied therein, said computer readable program code adapted to be executed to implement a method for generating a report, said method comprising:

sending a key and a key index pointing to an index element within the key to a processor in response to determining the presence of the key in the message, wherein determining the presence of the key in the message is performed in a content addressable memory, searching for a suffix by performing a byte-by-byte comparison of the elements of the pre-defined string that occur starting from the index element with corresponding position-wise matching elements of the message in a forward direction starting from the index element, searching for a reverse prefix by traversing a reverse prefix tree, wherein the reverse prefix tree comprises a root node, invalid nodes, and valid nodes, wherein the invalid node comprises elements that does not represent a valid reverse suffix for a pre-defined string, and performing a byte-by-byte comparison of the elements of the pre-defined string that occur prior to the index element with corresponding position-wise matching elements of the message in a reverse direction starting from an element prior to the index element, wherein the reverse prefix is searched for a longest matching valid reverse prefix, and determining that the pre-defined string is found in the message if the search for the suffix and the longest matching valid reverse prefix is successful, wherein searching for a longest matching valid suffix, and storing tags of the longest matching valid suffix in a memory, wherein searching for the suffix is performed by traversing a suffix tree, wherein the suffix tree comprises a root node, invalid nodes, and valid nodes, wherein an invalid node of the suffix tree comprises elements that does not represent a valid portion of the suffix for the pre-defined string, wherein a valid node of the suffix tree comprises elements that represent a valid portion of the suffix for the pre-defined string and a first tag, wherein the first tag includes an identifier of the pre-defined string and an identifier of the suffix tree, wherein the first tag of the valid node that matches the search in the suffix tree is stored in a first set of the memory.

8. The computer program product of claim 7 wherein search for a reverse prefix is performed by traversing a reverse prefix tree, wherein the reverse prefix tree comprises a root node, invalid nodes, and valid nodes, wherein the invalid node comprises elements that does not represent a valid reverse suffix for a predefined string, wherein a valid node of the reverse prefix tree comprises elements that represent a valid reverse prefix for the pre-defined string and a second tag, and wherein the second tag includes an identifier of the pre-defined string and an identifier of the reverse prefix tree, wherein the second tag of the valid node that matches the search in the reverse prefix tree is stored in a second set of the memory.

9. The computer program product of claim 8, wherein the search for the pre-defined string is positive if the second tag in the second set has a corresponding first tag in the first set.

* * * * *